United States Patent
Uehara

(10) Patent No.: US 9,638,918 B2
(45) Date of Patent: May 2, 2017

(54) DISPLAY DEVICE AND HEAD-UP DISPLAY DEVICE PROVIDED THEREWITH

(71) Applicant: Japan Display Inc., Tokyo (JP)

(72) Inventor: Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 58 days.

(21) Appl. No.: 14/103,432

(22) Filed: Dec. 11, 2013

(65) Prior Publication Data

US 2014/0177040 A1  Jun. 26, 2014

(30) Foreign Application Priority Data

Dec. 21, 2012  (JP) .................................. 2012-280209

(51) Int. Cl.
  *G02B 27/01* (2006.01)
  *G02B 5/20* (2006.01)
  *G02B 5/30* (2006.01)

(52) U.S. Cl.
  CPC ......... *G02B 27/0101* (2013.01); *G02B 5/208* (2013.01); *G02B 5/3033* (2013.01); *G02B 2027/0118* (2013.01)

(58) Field of Classification Search
  CPC ........ G02B 5/208; G02B 5/281; G02B 5/282; G02B 5/30–5/3058; G02B 27/01; G02B 27/0172; G02B 2027/011; G02B 2027/0178; G02B 27/0101; G02B 2027/0118; G02B 2027/0192–2027/196; G02F 1/133509; G02F 1/133514–1/133516; G02F 1/133606; G02F 1/153–1/1533; G02F 2001/133519–2001/133521; G02F 2001/133618; G02F 2001/133628; G02F 2001/1536; G02F 2201/08–2201/083; G02F 2203/11; G02F 2203/60
  USPC ...... 359/350, 352, 359, 360, 487.01–487.06, 359/629, 630, 631; 353/55; 349/104–106
  See application file for complete search history.

(56) References Cited

U.S. PATENT DOCUMENTS

| 4,747,674 | A | * | 5/1988 | Butterfield et al. .......... 359/590 |
| H779 | H | * | 5/1990 | Verona ......................... 359/630 |
| 5,268,788 | A | * | 12/1993 | Fox et al. ................ 359/487.04 |
| 6,211,934 | B1 |  | 4/2001 | Habing et al. |

(Continued)

FOREIGN PATENT DOCUMENTS

| JP | 59-116928 | 8/1984 |
| JP | 04-288515 | 10/1992 |

(Continued)

OTHER PUBLICATIONS

Notice of Rejection issued in connection with Japanese Patent Application No. 2012-280209, dated Apr. 21, 2015. (6 pages).

*Primary Examiner* — Stephone B Allen
*Assistant Examiner* — Adam W Booher
(74) *Attorney, Agent, or Firm* — K&L Gates LLP

(57) ABSTRACT

A display device includes a display panel having a display surface, an infrared cut filter layer disposed at a display surface side of the display panel, and a polarization layer disposed at a position farther from the display surface than the infrared cut filter layer in such a manner that the polarization layer is in contact with the infrared cut filter layer, the polarization layer having a higher transmittance of infrared light than that of the infrared cut filter layer.

7 Claims, 2 Drawing Sheets

(56) References Cited

U.S. PATENT DOCUMENTS

| | | | | |
|---|---|---|---|---|
| 6,369,871 B1 * | 4/2002 | Hanada et al. | ................ | 349/158 |
| 6,800,378 B2 * | 10/2004 | Hawa | ...................... | G02B 1/111 |
| | | | | 428/206 |
| 7,193,779 B2 * | 3/2007 | Kim | ....................... | G02B 1/105 |
| | | | | 313/478 |
| 2009/0233048 A1 * | 9/2009 | Murata | ................ | G02B 5/0221 |
| | | | | 428/143 |
| 2011/0116162 A1 * | 5/2011 | Tsujimura | .......... | G02B 27/0006 |
| | | | | 359/359 |
| 2011/0310470 A1 | 12/2011 | Horie | | |
| 2012/0062511 A1 * | 3/2012 | Ishizaki | .................. | G06F 3/044 |
| | | | | 345/174 |

FOREIGN PATENT DOCUMENTS

| | | |
|---|---|---|
| JP | 2002-500382 | 1/2002 |
| JP | 2007-065011 | 3/2007 |
| JP | 2008-065213 | 3/2008 |
| JP | 2010-243862 | 10/2010 |
| WO | 2010/109723 | 9/2010 |

\* cited by examiner

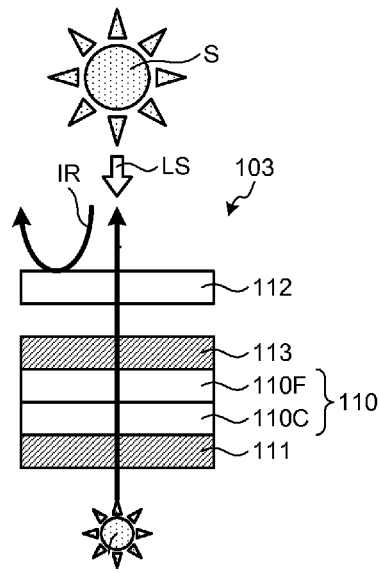
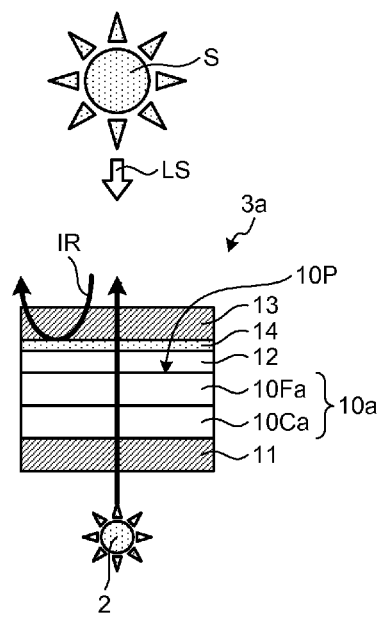

DISPLAY DEVICE AND HEAD-UP DISPLAY DEVICE PROVIDED THEREWITH

CROSS REFERENCES TO RELATED APPLICATIONS

The present application claims priority to Japanese Priority Patent Application JP 2012-280209 filed in the Japan Patent Office on Dec. 21, 2012, the entire content of which is hereby incorporated by reference.

BACKGROUND

1. Field of the Invention

The present invention relates to a display device and a head-up display device provided therewith.

2. Description of the Related Art

For example, there is known a head-up display (HUD) device which is disposed inside of a vehicle and which is designed to project an image displayed on a display unit on a front window. In such a head-up display device, it is known that an external light entered through the front window may affect the display unit in various ways. For example, a temperature of a liquid crystal panel (LC panel) may be risen due to the external light entered through the front window. In order to suppress such a temperature rise, Japanese Patent Application Laid-open No. 2007-65011(JP-A-2007-65011) proposes a technology in which an infrared cut filter is disposed in front of the LC panel, specifically, an a side from which the external light enters.

In the technology disclosed in JP-A-2007-65011, the infrared cut filter is a unit different from the liquid crystal panel. Thereby, the number of the required components or elements and the number of the manufacturing processes may increase.

SUMMARY

It is an object of the present invention to at least partially solve the problems in the conventional technology.

There is disclosed a display device including a display panel having a display surface, an infrared cut filter layer disposed at a display surface side of the display panel, and a polarization layer disposed at a position farther from the display surface than the infrared cut filter layer in such a manner that the polarization layer is in contact with the infrared cut filter layer, the polarization layer having a higher transmittance of infrared light than that of the infrared cut filter layer.

There is disclosed a head-up display device including the aforementioned display device and a minor configured to reflect an image projected from the display device.

According to the present disclosure, it is possible to realize the display panel integrated with the infrared cut filter layer by disposing the infrared cut filter layer between the display surface side polarization layer and the display surface. Consequently, according to the present disclosure, the number of the required components or elements and the number of the manufacturing processes can be reduced. Thereby, the manufacturing cost can be reduced.

The above and other objects, features, advantages and technical and industrial significance of this invention will be better understood by reading the following detailed description of presently preferred embodiments of the invention, when considered in connection with the accompanying drawings.

Additional features and advantages are described herein, and will be apparent from the following Detailed Description and the figures.

BRIEF DESCRIPTION OF THE FIGURES

FIG. 3 is a sectional view illustrating a display device according to a comparative embodiment; and FIG. 4 is a sectional view illustrating a display device according to a modification of the present embodiment.

DETAILED DESCRIPTION

The embodiments of the present disclosure will be described in the following order with reference to the accompanying drawings.

1. Head-up Display Device
    1-1. General Configuration
    1-2. Infrared Cut Filter
    1-3. Modification
2. Configuration of the Present Disclosure The following description is only for illustrative purpose. Any change, rearrangement, modification or the like readily derived from or substantially equivalent with the present disclosure without departing from the spirit and scope of the invention is encompassed within the present invention. For better understanding of the disclosure, the accompanying drawings may be schematic and not to scale with actual width, thickness, shapes of individual elements or components in actual embodiments. In any case, the accompanying drawings are for illustrative purpose only and not to be construed as any limitation of the present disclosure. In the following description and drawings, the corresponding elements or components in the plurality of drawings carry the identical numeric references, and the redundant explanation may be omitted as appropriate.

[1. Head-up Display Device]

<1-1. General Configuration>

Figure 1:
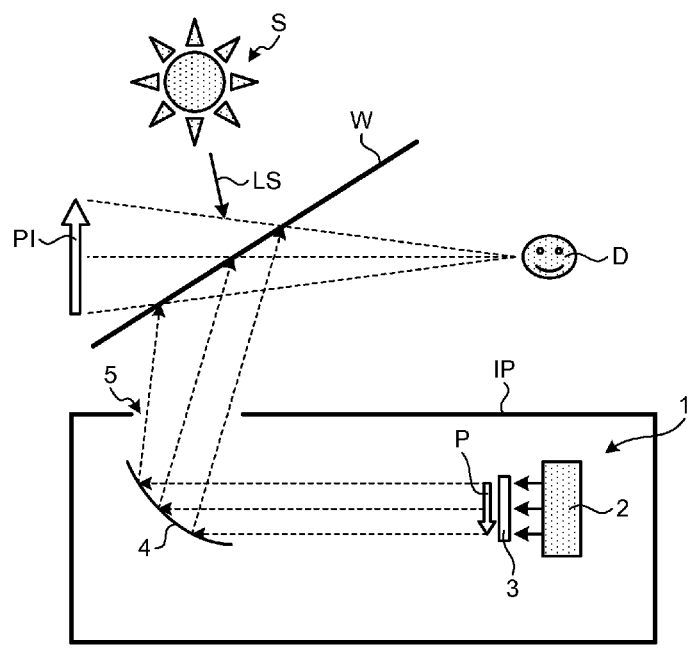
FIG. 1 is a schematic view illustrating a head-up display device according to a preferred embodiment.

FIG. 1 is a schematic view illustrating a head-up display device according to a preferred embodiment of the present disclosure. The head-up display 1 is mounted on a vehicle such as car, bus, truck and the like, and thus displays information on a front window W of the vehicle. A driver D of the vehicle can view the information displayed on the front window W, while he/she keeps his/her eyes on a front view.

The head-up display device 1 includes a light source 2, a display device 3, and a mirror 4. The light source 2 may be, but not exclusively, a light emitting diode (LED) for example. The display device 3 may be, but not exclusively, a liquid crystal display panel (LCD panel) for example. The mirror 4 is a concave mirror. The head-up display device 1 has an opening 5 at a position facing both the front window W and the minor 4.

An image P projected by the display device 3 is reflected by the minor 4 and projected on the front window W through the opening 5. The mirror 4 magnifies the image P and projects the magnified image P on the front window W. Through the front window W, the driver D views a virtual image PI of the image P projected by the display device 3.

The front window W of the vehicle is irradiated with a light from the sun S (i.e. sunlight LS). The sunlight LS which irradiates the front window W is reflected by the mirror 4 through the opening 5 of the head-up display device 1, and irradiates the display device 3. As described above, when the mirror 4 reflects the image P displayed by the display device 3, the mirror 4 magnifies the image P and projects the magnified image P on the front window W. Thereby, the sunlight LS from the front window W is demagnified by the mirror 4. Thus, the display device 3 is irradiated with such demagnified sunlight LS.

A temperature of the display device 3 is risen by infrared light contained in the sunlight LS, especially by near-infrared light having a wavelength approximately of 800 nm to 2500 nm. Since the sunlight LS is collected by the mirror 4, the energy density of the infrared light which irradiates the display device 3 tends to be great. Since the display device 3 is housed in a front panel IP of the vehicle, the display device 3 is used in an environment where a heat tends to be accumulated. Thus, the display device 3 is used in an environment where a temperature tends to rise. In the present embodiment, an infrared cut filter is disposed between the display device 3 and the mirror 4, so that an amount of the infrared light contained in the sunlight LS which irradiates the display device 3 through the mirror 4 is reduced, and thereby the temperature rise of the display device 3 is suppressed. The infrared cut filter and the display device 3 provided therewith will now be described.

<1-2. Infrared Cut Filter>

Figure 2:
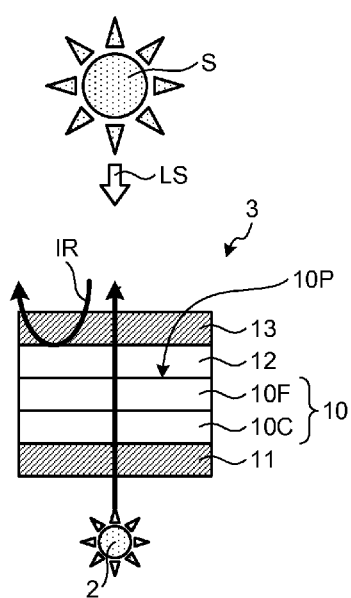
FIG. 2 is a sectional view illustrating a display device according to the present embodiment.

FIG. 2 is a sectional view illustrating a display device according to the present embodiment. FIG. 3 is a sectional view illustrating a display device according to a comparative embodiment. The display device 3 includes a display panel 10, an infrared cut filter layer 12, and a polarization layer 13. In the present embodiment, the display device 3 includes a polarization layer 11 on a side opposite to a display surface 10P of the display panel 10, that is, on a surface side of a circuit substrate 10C facing the light source 2. Hereinafter, the polarization layer 13 on the display surface 10P side may be called the display surface side polarization layer 13 as appropriate. In the present embodiment, the display panel 10 is a liquid crystal display panel (LCD panel). The display panel 10 includes a color filter substrate 10F provided with a color filter, and a circuit substrate 10C provided with a thin film transistor (TFT) and the like. A liquid crystal is disposed between the color filter substrate 10F and the circuit substrate 10C.

The infrared cut filter layer 12 is disposed on the display surface 10P side of the display panel 10. The display surface 10P of the display panel 10 is a surface of the color filter substrate 10F. The polarization layer 13 is in contact with the infrared cut filter layer 12 and is disposed at a position farther than the infrared cut filter layer 12 from the display surface 10P. The infrared cut filter layer 12 and the display surface side polarization layer 13 are arranged in this order in a direction away from the display surface 10P of the display panel 10. When viewed from the sun S, the polarization layer 13 and the infrared cut filter layer 12 are arranged in this order. Thus, the display surface side polarization layer 13 is irradiated with the sunlight LS from the sun S prior to the infrared cut filter layer 12.

The infrared cut filter layer 12 has a function to reflect the infrared light IR contained in the sunlight LS, especially the near-infrared light having the wavelength approximately of 800 nm to 2500 nm. That is, in the infrared cut filter layer 12, a transmittance of the near-infrared light is lower than that of visible light. In the present embodiment, for example, the infrared cut filter layer 12 has an optical property which the transmittance in a visible light region is 75% or more, the transmittance decreases beyond the visible light region, and the transmittance in a near-infrared region is 10% or less.

The display surface side polarization layer 13 has a higher transmittance of the infrared light IR than that of the infrared cut filter layer 12. Such a display surface side polarization layer 13 may be an iodine-based polarization layer 13. The iodine-based display surface side polarization layer 13 has a higher transmittance of light having the wavelength in the infrared light region. Thereby, a hot minor may be disposed on a side of the display surface side polarization layer 13, which side is facing the display surface 10P. The display surface side polarization layer 13 is not limited to the iodine-based polarization layer, and may be a polarization layer using a wire grid polarizer.

In an example described above, the infrared cut filter layer 12 has a transmittance in the near-infrared region of 10% or less, while the display surface side polarization layer 13 has a transmittance in the near-infrared region of 70% or more. Owing to such a configuration of the display device 3, the infrared light IR emitted from the sun S transmits through the display surface side polarization layer 13 and is reflected by the infrared cut filter layer 12, as illustrated in FIG. 2. Since the amount of the infrared light IR which reaches the display panel 10 is reduced, the temperature rise of the display device 3 including the display panel 10 is suppressed.

In the present embodiment, the infrared cut filter layer 12 may be an infrared reflective film formed on the display surface 10P. For example, the infrared cut filter layer 12 can be obtained by laminating a plurality of dielectric films (e.g. a plurality of λ/4 layers) between the display surface side polarization layer 13 and the display surface 10P of the display panel 10. For example, the laminated dielectric films may be formed on the display surface 10P of the display panel 10 which may be a glass. The λ/4 layers can be formed through a generally known deposition process. Thereby, it is possible to form the infrared cut filter layer 12 between the display surface 10P and the display surface side polarization layer 13 in a relatively simple manner. Thus, it is also possible to reduce the manufacturing cost.

The infrared cut filer layer 12 may be an infrared reflective film laminated or attached on the display surface 10P of the display panel 10. In a case where the λ/4 layer is used for the infrared cut filter layer 12, the infrared cut filter layer 12 may be formed on either the display surface 10P of the display panel 10 or the display surface side polarization layer 13. In a case where the infrared reflective film is used for the infrared cut filter layer 12, the infrared cut film layer 12 may be attached on either the display surface 10P of the display panel 10 and the display surface side polarization layer 13. In a case where the plurality of λ/4 layers are used integrally with the display surface side polarization layer 13, these λ/4 layers may be formed into a film and then attached on either the display surface 10P of the display panel 10 and the display surface side polarization layer 13.

FIG. 3 illustrates a display device 103 according to a comparative embodiment. The display device 103 includes a display panel 110 provided with a color filter substrate 110F and a circuit substrate 110C, and polarization layers 111, 113. The display device 103 further includes an infrared cut filter 112 at a position apart from the polarization layer 113. In the display device 103 having such a structure, the infrared cut filter layer 112 is a unit different from the display panel 110. Therefore, the number of the required components or elements may increase, and the number of the manufacturing processes may increase. Furthermore, a head-up display device provided with the display device 103 is installed in a vehicle where the environment apt to be high temperature and high humidity. Therefore, the infrared cut filter layer 112 may be deteriorated in such environment.

In the present embodiment, the infrared cut filter layer 12 is disposed between the display surface side polarization layer 13 and the display surface 10P. Thereby, the infrared cut filter layer 12 is protected by the display surface side polarization layer 13. Specifically, in a case where the infrared cut filter layer 12 is formed by laminating the λ/4 layers, the λ/4 layers may be peeled off due to the deterioration. According to the aforementioned structure, however, the durability and reliability of the infrared cut filter layer 12 are improved. Since the head-up display device 1 provided with the display device 3 is installed in a vehicle where the environment apt to be high temperature and high humidity, it is preferable to protect the infrared cut filter layer 12 by the display surface side polarization layer 13. Furthermore, by disposing the infrared cut filter layer 12 between the display surface side polarization layer 13 and the display surface 10P, it is possible to realize the display panel 10 integrated with the infrared cut filter layer 12, or realize the display surface side polarization layer 13 having an infrared cut function therein. Consequently, as for the display device 3, the number of the required components or elements and the number of the manufacturing processes can be reduced. Thereby, the manufacturing cost can be reduced.

<1-3. Modification>

FIG. 4 is a sectional view illustrating a display device according to a modification of the present embodiment. The display device 3a includes a display panel 10a of IPS (In-Plane Switching) mode or FFS (Fringe Field Switching) mode. The display panel 10a includes a color filter substrate 10Fa and a circuit substrate 10Ca. The display device 3a includes a conductive layer 14 at a side of the display surface 10P of the display panel 10a. The infrared cut filter layer 12 is disposed on the display surface 10P and is in contact with the conductive layer 14. The infrared cut filter layer 12, the conductive layer 14, and the display surface side polarization layer 13 included in the display device 3a are disposed in this order in a direction away from the display surface 10P.

The infrared cut filter layer 12 is an insulating layer. Thereby, if the infrared cut filter layer 12 is disposed between the display surface side polarization layer 13 and the conductive layer 14, static electricity from the display surface side polarization layer 13 cannot be conducted to the conductive layer 14. The display device 3a can conduct the static electricity from the display surface side polarization layer 13 to the conductive layer 14, by making contact the conductive layer 14 with the display surface side polarization layer 13 and by disposing the infrared cut filter layer 12 between the conductive layer 14 and the display surface 10P.

According to the present disclosure, the number of the required components or elements and the number of the manufacturing processes can be reduced in the liquid crystal panel provided with the infrared cut filter.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

[2. Configuration of the Present Disclosure]

The present disclosure can employ the following configurations.

(1) A display device includes a display panel having a display surface, an polarization layer disposed at a position farther from the display surface than the infrared cut filter layer in such a manner that the polarization layer is in contact with the infrared cut filter layer, the polarization layer having a higher transmittance of infrared light than that of the infrared cut filter layer.

(2) The display device according to (1), further including a conductive layer at the display surface side of the display panel, wherein the infrared cut filter layer is in contact with the conductive layer.

(3) The display device according to (1), wherein the polarization layer is an iodine-based polarization layer.

(4) The display device according to (1), wherein the infrared cut filter layer reflects infrared light.

(5) The display device according to (4), wherein the infrared cut filter layer is an infrared reflective film deposited on the display surface.

(6) The display device according to (4), wherein the infrared cut filter layer is an infrared reflective film attached on the display surface.

(7) A head-up display device includes the display device according to (1) and a mirror configured to reflect an image projected from the display device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
   a liquid crystal display panel having a display surface;
   an infrared cut filter layer that is disposed on a display surface side of the liquid crystal display panel and that directly contacts the liquid crystal display panel, the infrared cut layer including a λ/4 layer that is a dielectric layer;
   a polarization layer disposed at a position farther from the display surface than the infrared cut filter layer, the polarization layer having a higher transmittance of infrared light than that of the infrared cut filter layer; and
   a conductive layer that is disposed at the display surface side of the liquid crystal display panel and that directly contacts the polarization layer, the conductive layer configured to conduct static electricity from the polarization layer,
   wherein the infrared cut filter layer, the conductive layer, and the polarization layer are sequentially stacked on the liquid crystal display panel.

2. The display device according to claim 1, wherein the polarization layer is an iodine-based polarization layer.

3. The display device according to claim 1, wherein the infrared cut filter layer reflects infrared light.

4. The display device according to claim 3, wherein the infrared cut filter layer is an infrared reflective film deposited on the display surface.

5. The display device according to claim 3, wherein the infrared cut filter layer is an infrared reflective film attached on the display surface.

6. A head-up display device comprising:
   the display device according to claim 1; and
   a mirror configured to reflect an image projected from the display device.

7. The display device according to claim 1,
wherein the conductive layer is positioned between the polarization layer and the infrared cut filter layer, and
wherein the infrared cut filter layer contacts the liquid crystal display panel.

\* \* \* \* \*